US 8,295,188 B2

(12) United States Patent
Elrod

(10) Patent No.: US 8,295,188 B2
(45) Date of Patent: Oct. 23, 2012

(54) VOIP SECURITY

(75) Inventor: Craig T. Elrod, Santa Clara, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 488 days.

(21) Appl. No.: 11/694,767

(22) Filed: Mar. 30, 2007

(65) Prior Publication Data

US 2008/0240128 A1    Oct. 2, 2008

(51) Int. Cl.
*H04L 12/26* (2006.01)

(52) U.S. Cl. ............ 370/252; 370/253; 370/419; 726/3

(58) Field of Classification Search .................. 370/241, 370/252, 253, 351, 352, 353, 389, 392, 401, 370/419, 420, 421, 431, 432, 433; 726/3
See application file for complete search history.

(56) References Cited

U.S. PATENT DOCUMENTS

| | | | |
|---|---|---|---|
| 5,450,483 A * | 9/1995 | Williams ................. | 379/112.04 |
| 6,003,084 A * | 12/1999 | Green et al. .................. | 709/227 |
| 6,356,629 B1 * | 3/2002 | Fourie et al. ............... | 379/112.1 |
| 6,363,489 B1 | 3/2002 | Comay et al. | |
| 6,721,424 B1 * | 4/2004 | Radatti .......................... | 380/286 |
| 6,771,649 B1 | 8/2004 | Tripunitara et al. | |
| 7,027,398 B2 * | 4/2006 | Fang ............................. | 370/235 |
| 7,072,332 B2 * | 7/2006 | D'Souza ....................... | 370/352 |
| 7,076,650 B1 * | 7/2006 | Sonnenberg .................. | 713/151 |
| 7,095,716 B1 * | 8/2006 | Ke et al. ....................... | 370/230 |
| 7,234,168 B2 * | 6/2007 | Gupta et al. .................... | 726/25 |
| 7,257,515 B2 * | 8/2007 | Haeuptle ....................... | 702/185 |
| 7,293,238 B1 | 11/2007 | Brook et al. | |
| 7,409,714 B2 * | 8/2008 | Gupta et al. ..................... | 726/23 |
| 7,412,722 B1 * | 8/2008 | Norris et al. ..................... | 726/22 |
| 7,424,024 B2 * | 9/2008 | Chen et al. ..................... | 370/401 |
| 7,451,212 B2 * | 11/2008 | Friedman ....................... | 709/224 |
| 7,546,635 B1 * | 6/2009 | Krohn et al. ..................... | 726/11 |
| 7,593,343 B1 * | 9/2009 | Croak et al. ..................... | 370/241 |
| 7,594,259 B1 * | 9/2009 | Audet et al. ..................... | 726/11 |
| 7,690,040 B2 * | 3/2010 | Frattura et al. .................. | 726/26 |
| 7,748,040 B2 | 6/2010 | Adelstein et al. | |
| 7,843,914 B2 * | 11/2010 | Havemann et al. ........... | 370/389 |
| 8,000,329 B2 * | 8/2011 | Fendick et al. ............... | 370/392 |
| 2001/0044893 A1 * | 11/2001 | Skemer ......................... | 713/153 |
| 2002/0015387 A1 * | 2/2002 | Houh ............................ | 370/250 |

(Continued)

FOREIGN PATENT DOCUMENTS

WO    WO-2005112390    11/2005

OTHER PUBLICATIONS

Non-Final Office Action for U.S. Appl. No. 11/322,942, Mailed May 13, 2009, 21 pages.

(Continued)

*Primary Examiner* — Hassan Phillips
*Assistant Examiner* — Mark A Mais
(74) *Attorney, Agent, or Firm* — Blakely Sokoloff Taylor & Zafman, LLP

(57) ABSTRACT

A network switch automatically detects Voice over Internet Protocol (VoIP) traffic and mirrors the VoIP traffic to a security management device. The security management device measures a rate of call setup packets in the VoIP traffic. The security management device detects an attack based on a comparison of the measured rate of call setup packets to a threshold rate. Detected attacks are mitigated.

20 Claims, 5 Drawing Sheets

U.S. PATENT DOCUMENTS

| | | | |
|---|---|---|---|
| 2002/0085561 A1* | 7/2002 | Choi et al. | 370/392 |
| 2002/0133717 A1 | 9/2002 | Ciongoli et al. | |
| 2003/0009699 A1 | 1/2003 | Gupta et al. | |
| 2004/0098618 A1 | 5/2004 | Kim et al. | |
| 2004/0172557 A1 | 9/2004 | Nakae et al. | |
| 2004/0250158 A1 | 12/2004 | Le Pennec et al. | |
| 2004/0255167 A1 | 12/2004 | Knight | |
| 2005/0050365 A1 | 3/2005 | Seki et al. | |
| 2005/0136891 A1 | 6/2005 | Wang et al. | |
| 2005/0216770 A1 | 9/2005 | Rowett et al. | |
| 2006/0018466 A1 | 1/2006 | Adelstein et al. | |
| 2006/0095969 A1 | 5/2006 | Portolani et al. | |
| 2006/0123481 A1 | 6/2006 | Bhatnagar et al. | |
| 2006/0153153 A1 | 7/2006 | Bhagwat et al. | |
| 2007/0192862 A1 | 8/2007 | Vermeulen et al. | |
| 2008/0127349 A1* | 5/2008 | Ormazabal et al. | 726/25 |

OTHER PUBLICATIONS

Final Office Action for U.S. Appl. No. 11/322,942, Mailed Nov. 4, 2009, 22 Pages.

Bruschi, et al., "S-ARP: a Secure Address Resolution Protocol", Proceedings of the 19th Annual Computer Security Applications Conference (ACSAC 2003), (Dec. 2003), 66-74.

Kim, et al., "A Flow-based Method for Abnormal Network Traffic Detection", http://dpnm.postech.ac.kr/papers/NOMS/04/security-analysis/camera-ready/attack-analysis-v5-revision.pdf, (Apr. 2004).

Luca, Deri , "Passively Monitoring Networks at Gigabit Speeds Using Commodity Hardware and Open Source Software", http://www.nlanr.net/PAM2003/PAM2003papers/3775.pdf, (2003).

Non-Final Office Action for U.S. Appl. No. 11/322,942, Mailed Jan. 20, 2011, 25 pages.

Non-Final Office Action for U.S. Appl. No. 11/322,942, Mailed Jul. 7, 2011, 23 pages.

Portokalids, Georgios, "Zero Hour Worm Detection and Containment Using Honeypots", http://www.cs.columbia.edu/~porto/Home_files/thes-full-2side.pdf, 2004, pp. 1-73.

Non-Final Office Action for U.S. Appl. No. 11/322,942, Mailed Feb. 13, 2012, Whole Document.

* cited by examiner

VOIP SECURITY

FIELD

Embodiments of the invention relate to network security, and more particularly to Voice over Internet Protocol (VoIP) security.

BACKGROUND

Hacking is a term that is often used to describe the acts of a user who trespasses on computer systems for any number of reasons. Oftentimes, intruders hack into a system or network of systems ("system") with the intent to launch some form of attack against the system. An attacker, as used herein, refers to any user, host system, or remote host machine that hacks, trespasses, or intrudes onto a system and attempts to compromise the integrity or performance of the system.

Attackers can be very sophisticated and difficult to detect. Most attackers operate from or through a remote system or even a chain of several remote systems to obscure their identity and/or location. Attackers are often very thorough and methodical in using reconnaissance to create a detailed map of a network and identify any network vulnerabilities.

Reconnaissance typically involves a process of gathering information, scanning a target network, and probing for weaknesses in the target network before launching an attack. In the information-gathering phase, an attacker collects information about a network (e.g. a company network) in an attempt to obtain as many domain names as possible. The domain names are then used to query domain name servers (DNS servers) for network (e.g., Internet Protocol (IP)) addresses of hosts in the network. This process is sometimes called footprinting. Additionally, attackers may also perform a broad sweep of a network to probe for IP addresses assigned to additional hosts.

In the scanning phase, an attacker can learn which services are running on each host and which ports the services are using. An application service can be accessed from a network through a Transmission Control Protocol (TCP) or User Datagram Protocol (UDP) port number assigned to the application service.

In the final phase of reconnaissance, attackers search the target network specifically for resources such as device and file resources in order to acquire information about network security and network vulnerabilities.

Once the reconnaissance process has provided sufficient information, an attacker may launch an attack. There are many types of network attacks that can cause serious performance problems on a network. Attacks including, but not limited to, Denial of Service (DoS), Distribute DoS (DDoS), viruses, worms, polymorphic viruses, blended attacks, and Day-Zero threats can be launched against a network to disrupt configuration and routing information and physical network components. Attacks can also tie up and/or consume network bandwidth, host central processing unit (CPU) time, and disk space. One example of a DoS attack is a TCP flood attack. Another example of a DoS attack is a Smurf attack.

Most networks employ some form of network security to help against many of the attacks discussed above. However, many network security systems and/or devices rely on signature-based security techniques. In other words, these security systems maintain a list of known security threats, or signatures, and can only prevent or mitigate damage based on these known security threats. One problem with signature-based security is that it is not effective in preventing or mitigating unknown security threats and Day-Zero attacks. Additionally, many of today's network security systems need to be "in-line" with the network to mitigate threats and can, therefore, end up being bottlenecks or points of failure in the network.

Voice over Internet Protocol (VoIP) has special requirements with regard to Quality of Service (QoS), latency, jitter, packet loss and network availability. When adding security to VoIP to protect against attacks, such as those discussed above, all of these key metrics are disrupted. For example, a perimeter firewall is frequently used as a central location for deploying security policies, making it a significant bottleneck for traffic passing through the firewall.

Firewalls, Intrusion Detection System (IDS), Intrusion Detection Prevention (IDP), Network Address Translation (NAT)/Port Address Translation (PAT) traversal devices and VoIP gateways are incomplete with respect to converged voice, video and data networks because they cause network congestion, throughput delay and open security holes into internal Local Area Networks (LANs). Even the latest VoIP-aware firewalls cannot provide adequate throughput for VoIP traffic.

BRIEF DESCRIPTION OF THE DRAWINGS

The following description includes discussion of various figures having illustrations given by way of example of implementations of embodiments of the invention. The drawings should be understood by way of example, and not by way of limitation.

SUMMARY OF THE INVENTION

Figure 1A:
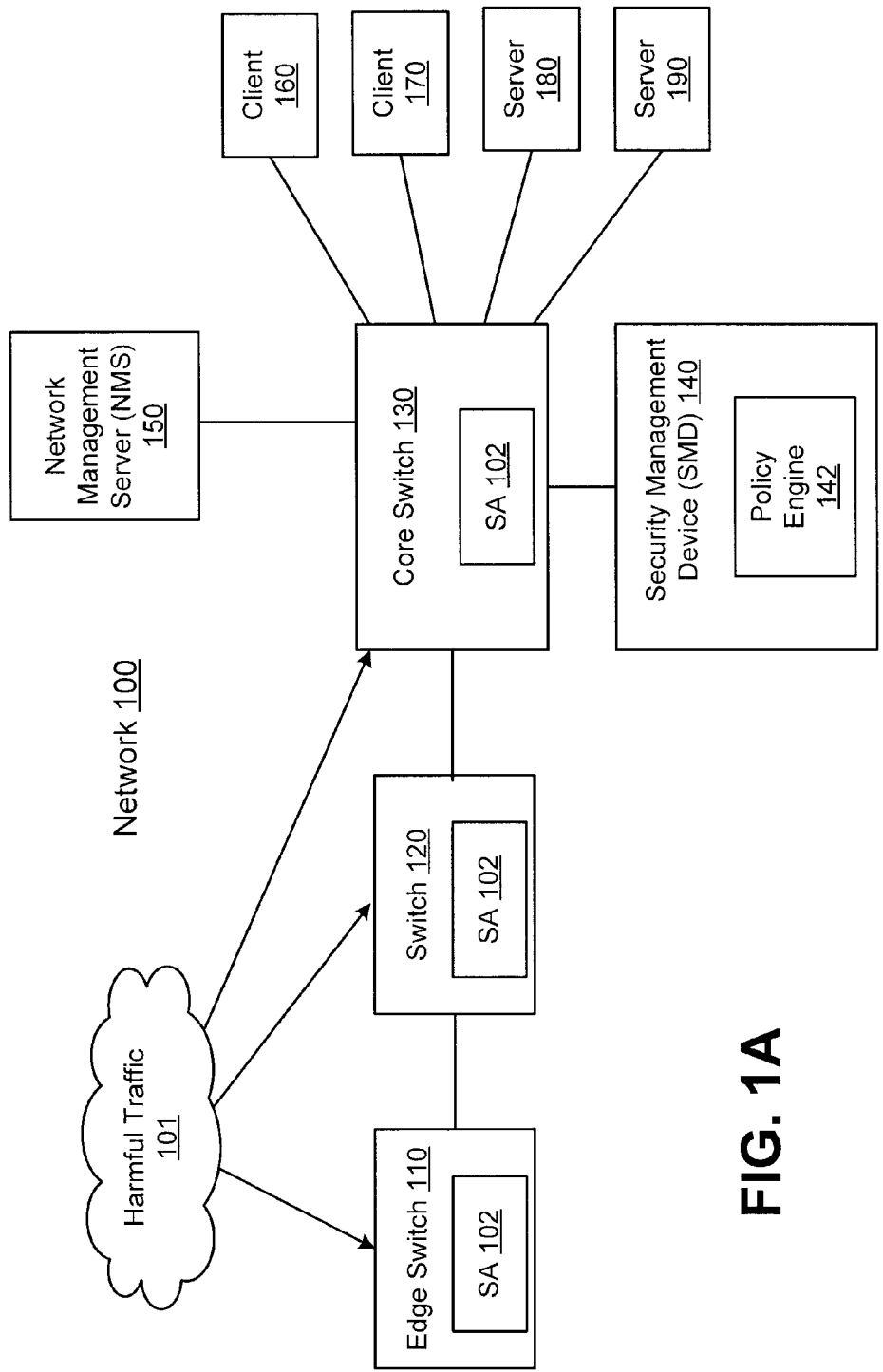
FIG. 1A is a block diagram illustrating an embodiment having a security management device.

A network switch automatically detects Voice over Internet Protocol (VoIP) traffic and mirrors the VoIP traffic to a security management device. The security management device measures a rate of call setup packets in the VoIP traffic and determines whether there are any anomalies based on a comparison of the measured rate to a predetermined threshold rate. Measured rates that exceed the threshold rate are considered threats and/or attacks. The security management device mitigates threats and attacks by blocking, redirecting, etc, traffic from the source of the threat or attack.

DETAILED DESCRIPTION

In one embodiment of the invention, threats are detected at a network switch, or simply, switch. As used herein, a threat may refer to network traffic that is a precursor to harmful network activity or that otherwise threatens the integrity/performance of the network or a system/device on the network. The terms "threat" or "network threat" may also be used interchangeably with "attack," "network attack," "attacker," "harmful traffic," "suspicious traffic," "source," or "source of harmful traffic" as used herein.

Threats are detected by a switch using dynamic policy rules designed to detect artifacts and identify footprints of the threats. In one embodiment, the switch utilizes Continuous, Learning, Examination, Action and Reporting of Flows (CLEAR-Flow) technology, available from Extreme Networks, Inc. of Santa Clara, Calif., assignee of the present invention. Dynamic policy rules are implemented, for example, using access control lists (ACLs), which define profiles of potentially problematic network traffic flows and corresponding actions to be taken by the switch if traffic flows meeting any one of these profiles are measured. In one embodiment, a switch measures the ratio of incoming Address Resolution Protocol (ARP) requests to outgoing ARP responses in the network traffic. If the ratio is above a predetermined threshold, the switch, using dynamic policy rules, may determine that a threat exists. In another embodiment, the switch measures the ratio of incoming TCP SYN packets to incoming TCP ACK packets. Again, if the ratio is above a predetermined threshold, the switch may determine that a threat exists.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates, or changes in rates, at which packets are received, etc. For example, ACLs may be used in a switch to detect VoIP traffic and/or rates based on port numbers contained in packet headers.

In one embodiment, network threats and/or VoIP traffic streams are copied and sent from the switch to a security management device for further analyzing. In addition to copying network threats and/or VoIP traffic streams, the switch sends other useful information to the security management device, for example, using an eXtensible Markup Language (XML) application program interface (API). The useful information can include details from the switch's forwarding database (FDB) such as media access control (MAC) addresses, IP addresses, and corresponding switch port numbers of ports with which devices assigned to those addresses are reachable.

The security management device is able to build communication streams with the information received from the switch to determine the exact source of a threat and/or target of attack. Building communication streams can involve identifying, analyzing, tracking, and/or extracting certain packet fields or other information from network traffic, including packets. In one embodiment, the security management device may track the source IP address field and the destination IP address field of packets to determine the source and the target of the attack. In another embodiment, the security management device uses the information from the switch's FDB to determine the source and the target of the attack. A combination of FDB information and packet field information may also be used. Thus, the security management device is able to combine collected information to construct or build a model that defines the communication stream between the source and the target of an attack.

Once the source of an attack has been determined, the security management device redirects the source data stream(s). In one embodiment, redirecting involves re-writing the ARP table on the attacker's system by sending unsolicited ARP requests that substitute the MAC address of the security management device in place of the MAC address of the intended target system. In other embodiments, redirecting can be done using ACLs, policy routing, virtual local area network (VLAN) identification (ID), Hypertext Transfer Protocol (HTTP) information, or XML tags. In embodiments, redirecting causes traffic and/or data streams from the attacker to be redirected and sent to the security management device instead of the intended target system. The security management device subsequently drops, ignores, or selectively passes the redirected traffic and/or data stream(s).

In addition to redirecting the attacker's system, the security management device dynamically builds a policy to be employed at the switch. A policy defines an action or set of actions to be carried out when a predetermined event or set of events occurs. In one embodiment, the policy causes the switch to block traffic from the source of an attack based on the IP address(es) of the attacker. In other embodiments, the policy causes the switch to block traffic based on MAC address(es), VLAN IDs, or switch port number(s) used by an attacker. Further embodiments include a policy that causes the switch to quarantine traffic from the attacker to an isolated VLAN, throttle traffic from the attacker by limiting the network bandwidth to the attacker, or warn other switches of the threat/attack.

Once a policy has been created, the security management device sends the policy to at least the switch that detected the threat, for example, using the XML API mentioned above. The switch then enforces the policy to mitigate the threat/attack.

FIG. 1A illustrates an embodiment of the invention. Harmful traffic 101 enters a network 100 through a switch 110, 120, or 130. Each switch monitors and examines every packet that arrives in real-time at a one gigabit per second (Gb/s) forwarding rate or a ten Gb/s forwarding rate. In other embodiments, the switch monitors/examines packets arriving at other forwarding rates.

In one embodiment, each switch contains a security agent 102 to monitor/examine traffic flowing through the switch. Security agents 102 each contain a policy file with access control list (ACL) rules that allow security agents 102 to increment counters and collect statistics on traffic flowing through switches. Additional rules are included in the policy files to monitor the counters and statistics. The ACL rules also define profiles of potentially problematic network traffic flows and corresponding actions to be taken by a switch if traffic flows meeting one of these profiles are measured. The policy files may be updated dynamically, as discussed in more detail later. Security agents 102 may also monitor a cumulative counter, a change or delta in a counter over a time interval, the ratio of two cumulative counters, and the ratio of a change or delta in two counters over a time interval.

Each switch is capable of detecting harmful traffic 101 using the dynamic policy rules discussed above. In one embodiment, harmful traffic is detected when a ratio of measured ARP requests to ARP replies exceeds a specified threshold. In another embodiment, harmful traffic is detected when a ratio of measured TCP SYN packets to TCP ACK packets exceeds a specified threshold. Harmful traffic is mirrored to a security management device (SMD) 140 reachable via, for example, a dedicated port, upon detection by a switch. Traffic that does not violate policy rules, however, is handled by the switch per standard bridging and routing technologies. Only harmful or potentially harmful traffic is mirrored to SMD 140. In one embodiment, traffic mirrored to SMD is labeled with the threat-type "suspicious." Mirroring suspicious traffic to SMD 140 allows SMD 140 to operate "virtually" in-line rather than physically in-line with the network. In other words, it is not necessary for traffic to pass through SMD 140 to reach a destination because only copies of suspicious traffic are passed to SMD 140. Thus, SMD 140 operates without the latency or point-of-failure risks inherent in physical in-line operation. In one embodiment, SMD 140 is a single device deployed at the network core, illustrated in FIG. 1A. In other embodiments, SMD 140 can be deployed at different locations within the network, including at a network edge.

Figure 1B:
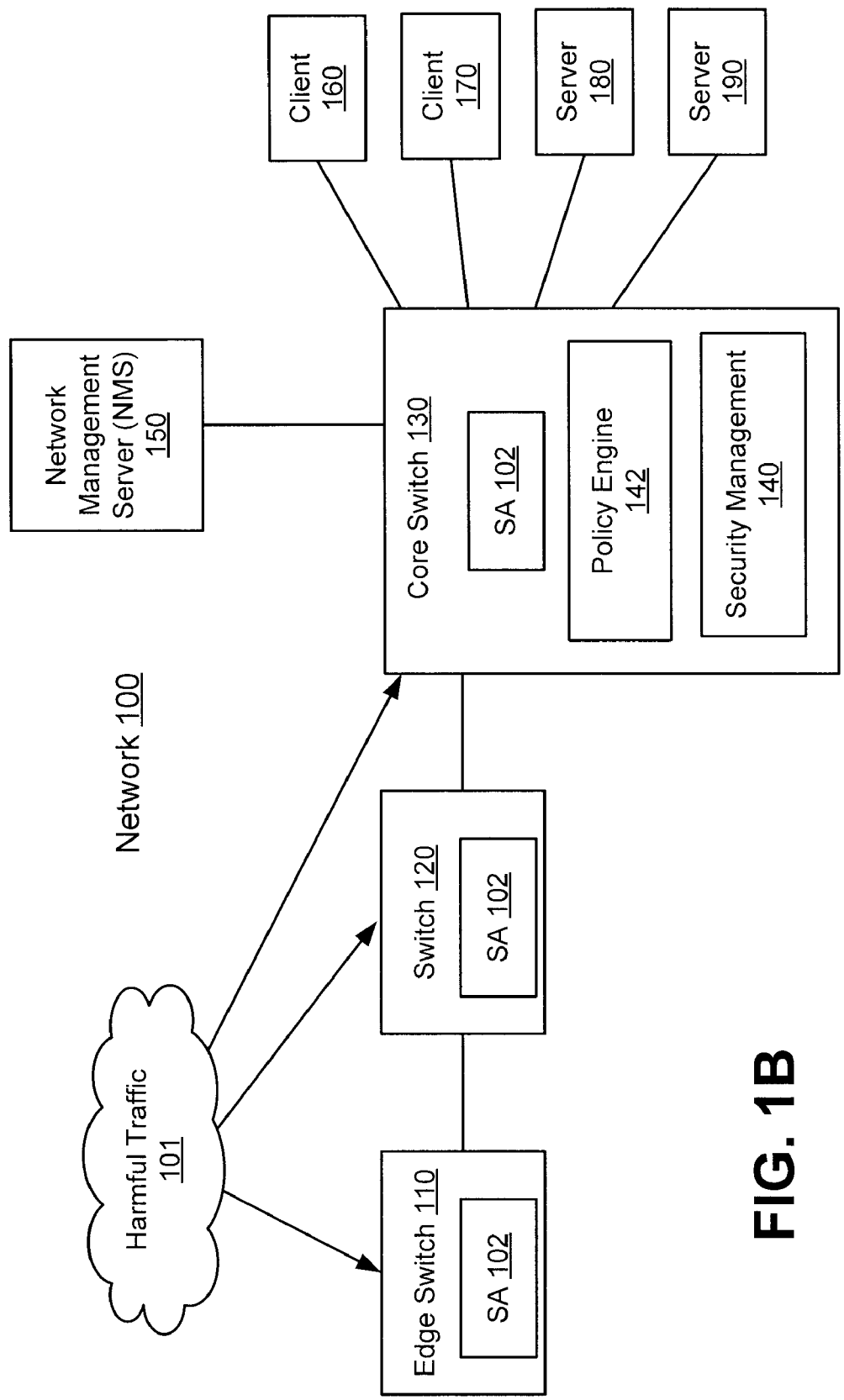
FIG. 1B is a block diagram illustrating an embodiment having security management within a network switch.

In another embodiment, SMD functionality is implemented using a combination of SMD 140 and a network management server 150. FIG. 1B is an illustration of yet another embodiment where SMD functionality, including threat detection logic, is implemented as an application-specific integrated circuit (ASIC) or a system-on-a-chip (SoC) within core switch 130 or any other network switch.

SMD 140 uses behavior-based threat detection methods to further classify, analyze and/or mitigate suspicious traffic mirrored from a switch. In one embodiment, SMD 140 identifies a communication stream by extracting information from suspicious traffic. Building a communication stream involves assembling information that allows SMD 140 to characterize the exact source and destination of the suspicious traffic. In one embodiment, the information extracted by SMD 140 includes source and destination IP addresses from the address fields of packets. In another embodiment, each switch provides information from its forwarding database (FDB) to SMD 140 using an XML application program interface (API). The provided information correlates MAC addresses with IP addresses and port numbers. SMD 140 uses this information to determine the exact source and destination of the suspicious traffic.

Network threats/attackers typically conduct network reconnaissance, including probing the network's address space. Most networks actually utilize only a portion of the available address space. Thus, in one embodiment, SMD 140 uses virtual decoys in the unused address space of the network to identify threats conducting reconnaissance. In another embodiment, SMD 140 provides false data about the network's topology to the source of a threat to interfere with attempts to acquire precise data about operating systems and application versions present on the network. Providing false data about the network's topology can delay the launch of an attack, creating more time to mitigate a threat and potentially prevent an attack altogether.

Having determined the source (e.g. MAC address) and destination of suspicious traffic, SMD 140 continues to monitor the suspicious traffic. In one embodiment, SMD 140 uses internal policy rules to further analyze suspicious traffic and, when conditions are met, escalate the threat-type, for example, from "suspicious" to "yellow alert." SMD 140 sends a dynamic ACL to security agent(s) 102 to further refine the policy for suspicious traffic flows. The ACL is dynamic in the sense that it is automatically sent to security agent(s) 102 in response to measured traffic flows—no network administrator/operator action or intervention is needed. Security agent(s) 102 apply the dynamic ACL at the respective switch (es) in real-time while the switch(es) continue(s) to mirror suspicious traffic to SMD 140.

While monitoring suspicious traffic and updating policy files in security agents 102, SMD 140 may also determine that suspicious traffic is actually harmful traffic representing a real threat to the integrity/stability of the network or a client/server operating on the network. In one embodiment, SMD 140 escalates the threat type, for example, from "yellow alert" to "red alert" when a real threat is detected and takes action(s) to mitigate the threat.

In one embodiment, SMD 140 redirects the source data stream (i.e., the source of the suspicious traffic), for example, in response to the red alert threat level, from an intended destination to an alternate destination. In most cases, the attacker will be unaware of the redirection of traffic, though it is not necessary that the attacker be unaware of this redirection.

In one embodiment, SMD 140 redirects the source data stream by reformulating the ARP tables of the source computer system. ARP table reformulation involves sending unsolicited ARP requests to the source computer system. Once received, these ARP requests substitute the MAC address of SMD 140 in place of the MAC address of the intended destination/target system. Thus, the ARP reformulation causes traffic from the source computer system that is intended for a particular target system to be received instead by SMD 140. In other embodiments, redirecting can be done using ACLs, policy routing, virtual local area network (VLAN) identification (ID), Hypertext Transfer Protocol (HTTP) information, or XML tags. In each of the above examples, SMD 140 initiates the redirecting process that causes traffic intended for a particular target system to be redirected to SMD 140.

SMD 140 can handle redirected traffic (e.g., packet traffic) in different ways. SMD 140 may ignore redirected packet traffic or silently discard it. In either case, the effect is that SMD 140 becomes a dead end for this traffic, thus eliminating any potential harm to the network from the traffic. However, if traffic flow conditions change or SMD 140 otherwise determines that certain packets are harmless, those packets may be forwarded to their originally intended destination.

In addition to redirecting the source data stream, SMD 140 builds a policy to mitigate the threat and/or block the source of the attack. In one embodiment, a policy engine 142 automatically generates policy rules for the policy. In another embodiment, NMS 150 generates policy rules for the policy.

In one embodiment, the policy is designed to cause network switches to block traffic based on the IP address(es) of the attacker. In other words, all traffic having a particular source IP address or source/destination IP address combination is blocked when detected at one of the network switches. In other embodiments, the policy causes network switches to block traffic based on MAC address(es), VLAN ID(s), switch port number(s), or other identifying information.

It is not necessary that the policy cause a switch to block traffic. Alternative embodiments may include a policy that causes a switch to quarantine harmful traffic to an isolated VLAN, throttle traffic from the attacker by limiting the network bandwidth available to the attacker, or warn other switches of the threat/attack.

After the policy has been created, it is sent from SMD 140 to the switch(es). In one embodiment, SMD 140 sends the policy to all switches. In another embodiment, SMD 140 sends the policy only to one switch. For example, if only a single switch stands logically between an attacker and the rest of the network, SMD 140 need only send the policy to that single switch. Security agent 102 implements the policy in real-time once it is received at the switch to mitigate harmful traffic.

Figure 2:
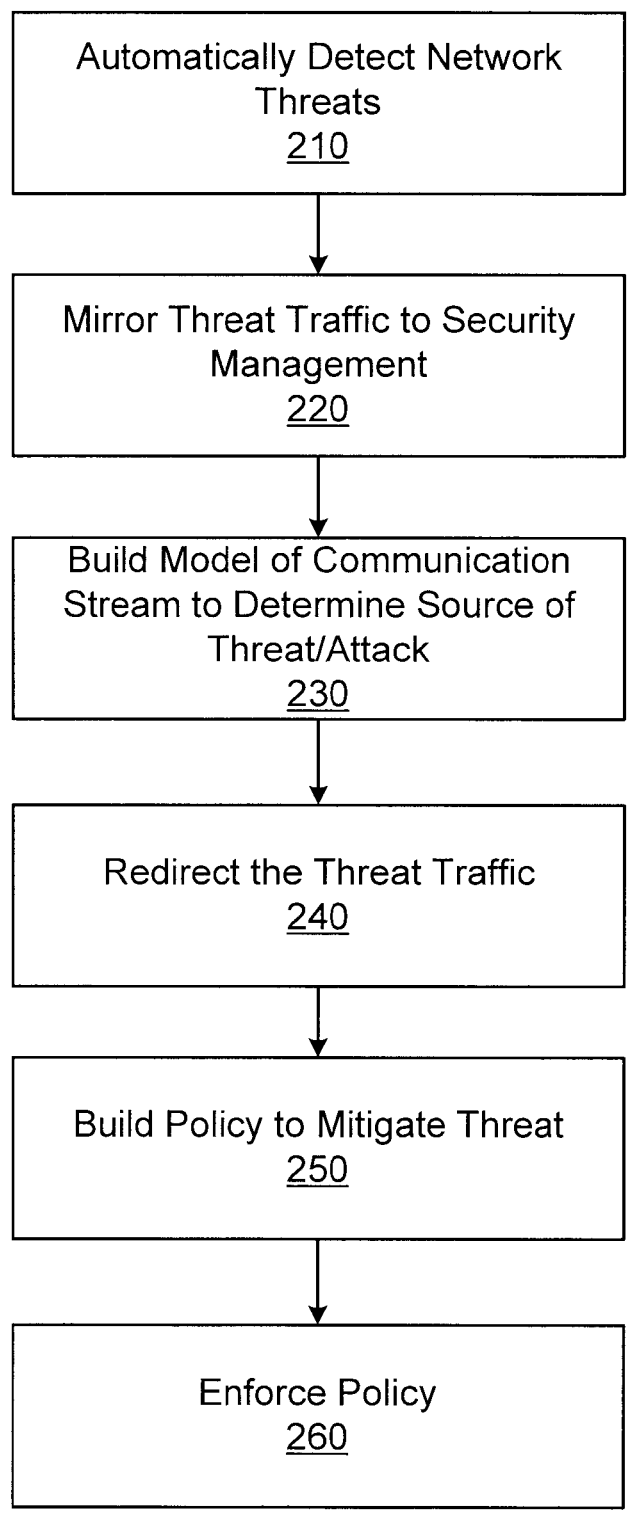
FIG. 2 is a flow diagram of an embodiment that employs security management for a network.

FIG. 2 is a flow diagram illustrating an embodiment of the invention. When a threat enters the network it is automatically detected 210. The network has the capability of measuring traffic flows. In one embodiment, a switch or other network device measures the ratio of incoming ARP requests to outgoing ARP responses in the network traffic. If the ratio is above a predetermined threshold, the switch or other network device, using dynamic policy rules, may determine that a threat exists. In another embodiment, the switch or other network device measures the ratio of incoming TCP SYN packets to outgoing TCP ACK packets. Again, if the ratio is above a predetermined threshold, the switch or other network device may determine that a threat exists.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates at which packets are received, etc.

When a switch or other device determines that a traffic flow has exceeded a predetermined threshold, meets a certain profile, or is otherwise a threat, the switch/device mirrors that traffic flow to security management 220. In one embodiment, a device having a dedicated port to receive mirrored threat traffic handles security management. In another embodiment, a security management device shares security management tasks with a network management server. In yet another embodiment, security management functionality is implemented in a network switch (e.g., software, firmware logic, or an application-specific integrated circuit (ASIC)). Security management can extract information from the mirrored threat traffic flows, including packet fields from individual packets. Thus, security management can extract source and destination IP address fields from packets in the mirrored threat traffic.

In one embodiment, the switch or other network device that detects a threat sends other information to security management in addition to mirroring the threat traffic flow, including information from the switch's forwarding database that correlates MAC addresses with IP addresses and/or port numbers. With this information, security management re-creates, or builds, a model of the communication stream between the source of the threat traffic and the intended destination of the threat traffic to determine the exact source and intended destination of the threat/attack 230.

Once the source of the threat traffic is known, security management redirects the threat traffic 240.

In one embodiment, security management redirects the threat traffic by reformulating the ARP tables of the source computer system (i.e. the computer system sending the threat traffic). In other embodiments, redirecting can be done using ACLs, policy routing, virtual local area network (VLAN) identification (ID), Hypertext Transfer Protocol (HTTP) information, or XML tags. In each of the above examples, security management initiates the redirecting process that causes traffic intended for a particular target system to be redirected to an alternate destination. In one embodiment, threat traffic is redirected to a security management device connected to a switch. In another embodiment, threat traffic is redirected to a particular switch having security management functionality. In yet another embodiment, redirecting causes threat traffic to be redirected to a network management server.

Security management also dynamically builds/creates a policy to mitigate the threat 250. In one embodiment, security management generates policy rules that cause a switch or other network device to block all incoming traffic from a particular source or block traffic having a particular destination. In other embodiments, the switch redirects traffic based on MAC addresses or IP addresses detected in incoming traffic. Other characteristics or profiles may also be used in determining which traffic to block. In addition to blocking traffic, policy rules can be created to cause a switch or other network device to throttle traffic from a particular source or throttle traffic traveling toward a particular destination. Other embodiments include rules for quarantining threat traffic to a designated VLAN and rules that cause other network switches or device to be warned of a threat/attack.

Once a policy has been created, it is sent to one or more network switches/devices, where it is enforced 260. Network switches/devices continue to monitor/examine traffic in real-time. As conditions or traffic flows change, security management may modify the policy for a particular switch/device or set of switches/devices.

Figure 3:
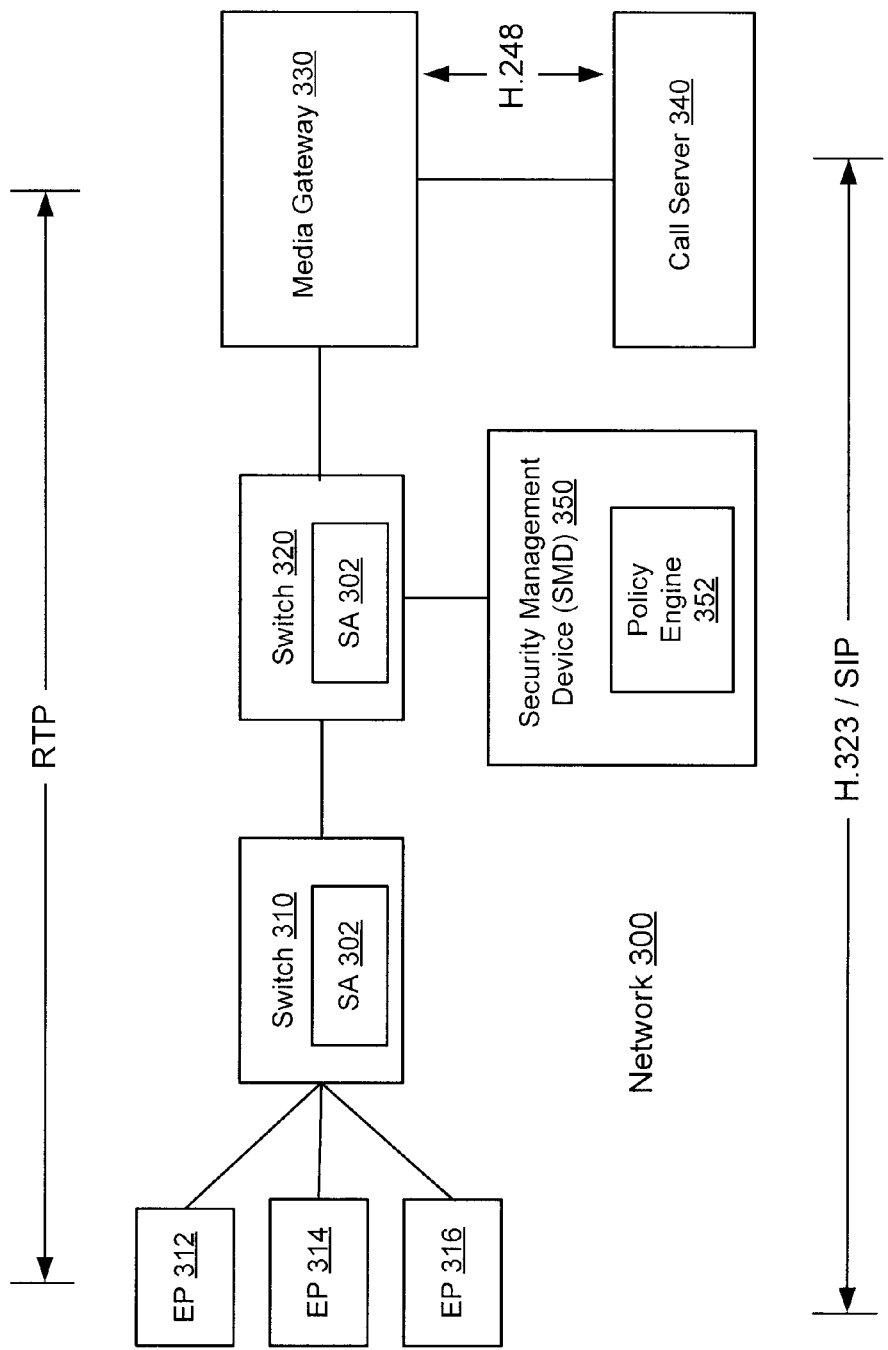
FIG. 3 is a block diagram illustrating an embodiment having a security management device.

FIG. 3 illustrates an example system for protecting Voice over Internet Protocol (VoIP) traffic. In one embodiment, a VoIP session is initiated (also referred to herein as "call setup") using the International Telecommunications Union (ITU) H.323 standard for audio and video communication across packetized networks. The ITU standard H.225 is the endpoint registration and call signaling component of H.323. H.225 registration messages, or Registration Admission Signal (RAS) messages, are transported as packets via UDP port 1719 between endpoints 312-316 and media gateway 330. H.225 call signaling messages (using the ITU Q.931 protocol) are transported as packets via TCP port 1720 between endpoints 312-316 and media gateway 330.

In another embodiment, a VoIP session is initiated (i.e., a VoIP call is setup) using the Internet Engineering Task Force (IETF) Session Initiation Protocol (SIP). Given that SIP is an application layer protocol, SIP traffic can be carried by various transport layer protocols including, but not limited to, TCP, UDP, and Stream Control Transmission Protocol (SCTP). UDP may be used to decrease overhead and increase speed and efficiency, or TCP may be used if Secure Sockets Layer (SSL)/Transport Layer Security (TLS) is incorporated for security services. Unlike H.225, SIP uses only port; the default port number is 5060.

Once a VoIP session is initiated, voice data is transported between two endpoints (e.g., endpoint 312 and endpoint 316) using Real-time Transport Protocol (RTP), developed by the Audio-Video Transport Working Group of the IETF and first published in 1996 as RFC 1889 which was replaced in 2003 by RFC 3550. Voice data is first encapsulated in RTP, then in UDP, and then in IP. UDP ports for RTP traffic are configured on call server 340 using the ITU H.248 standard. By default, RTP uses UDP ports ranging from port 2048 to port 65535. In one embodiment, a limit is placed on the range of available UDP ports for RTP traffic. For example, the range of ports might be limited to ports 2048-3048 in order to reduce the number of potential security holes in the network.

Security agents 302 on switches 310 and 320 monitor/examine traffic flowing through each respective switch. Security agents 302 each contain a policy file with ACL rules that allow security agents 102 to increment counters and collect statistics on traffic flowing through switches 310 and 320. In one embodiment security agents 302 include one or more ACLs that detect VoIP traffic and measure the rate of call setup packets and/or voice data packets based at least in part on port numbers. As discussed above, H.323 (one standard for VoIP call setup) uses UDP port 1719 and TCP port 1720, while SIP (another standard for VoIP call setup) uses port 5060. RTP uses a range of defined ports. Thus, switches 310 and/or 320 can detect VoIP traffic based on port numbers. However, embodiments are not limited to detecting traffic associated with these specific port numbers. ACLs can be created to detect traffic associated with any known port number designated for use in the VoIP call setup process.

Thus, referring again to FIG. 3, VoIP traffic (e.g., call setup and/or voice data) is detected at a switch (310 or 320) by security agent 302. The detected VoIP traffic is mirrored (i.e., copied) to security management device (SMD) 350. Mirroring VoIP traffic to SMD 350 allows SMD 350 to operate "virtually" in-line rather than physically in-line with the network. In other words, SMD 350 does not become a traffic bottleneck because only copies of VoIP traffic are passed to SMD 350 while the original VoIP traffic passes through the network normally. Thus, SMD 350 operates without the QoS, latency, jitter, packet loss or network availability risks inherent in physical in-line operation.

While SMD 350 is depicted in FIG. 3 as being deployed at switch 320, SMD 350 can be deployed at other locations within the network (e.g., switch 310, media gateway 330) in other embodiments. In yet another embodiment, the functionality of SMD 350, including threat detection logic, is implemented as an application-specific integrated circuit (ASIC) or a system-on-a-chip (SoC) within a switch (e.g., switch 320).

SMD 350 uses behavior-based threat detection methods to further classify, analyze and/or mitigate suspicious VoIP traffic mirrored from a switch. For example, SMD 350 checks mirrored VoIP traffic to determine whether any call setup streams between an endpoint and media gateway 330 exceed a predetermined threshold rate (e.g., in packets per second (pps)). Normal call setup should not exceed the threshold rate. If a call setup stream exceeds the threshold rate, SMD 350 determines that an attack on the network is taking place.

SMD 350 mitigates an attack by redirecting traffic from the source of the attack. In most cases, the attacker will be unaware of the redirection of traffic, though it is not necessary that the attacker be unaware of this redirection. In on embodiment, SMD 350 redirects traffic by reformulating the ARP tables of the source computer system. This causes all traffic from the source computer system that is intended for a particular target within network 300 to be received instead by SMD 350. In other embodiments, redirecting can be done using ACLS, policy routing, VLAN identification, HTTP information, or XML tags.

SMD 350 can handle redirected traffic (e.g., packet traffic) in different ways. SMD 350 may ignore redirected packet traffic or silently discard it. In either case, the effect is that SMD 350 becomes a dead end for this traffic, thus eliminating any potential harm to network 300 from the traffic.

In addition to redirecting traffic, SMD 350 builds a policy to mitigate the threat and/or block the source of the attack. In one embodiment, a policy engine 352 automatically generates policy rules for the policy. In another embodiment, policy rules are received from an external source.

In one embodiment, the policy is designed to cause network switches to block traffic (e.g., VoIP traffic) based on the IP address(es) of the attacker. In other words, traffic (e.g., VoIP traffic) having a particular source IP address or source/destination IP address combination is blocked when detected at one of the network switches. In other embodiments, the policy causes network switches to block traffic based on MAC address(es), VLAN ID(s), switch port numbers(s), or other identifying information.

It is not necessary that the policy cause a switch to block traffic. Alternative embodiments may include a policy that causes a switch to quarantine harmful traffic to an isolated VLAN, throttle traffic from the attacker by limiting the network bandwidth available to the attacker, or warn other switches of the threat/attack.

After the policy has been created, it is sent from SMD 350 to the switch(es). In one embodiment, SMD 350 sends the policy to all switches (e.g., 310 and 320). In another embodiment, SMD 350 sends the policy only to one switch. For example, if only a single switch stands logically between an attacker and the rest of the network, SMD 350 need only send the policy to that single switch. Security agent 302 implements the policy in real-time once it is received at the switch to mitigate harmful traffic.

Figure 4:
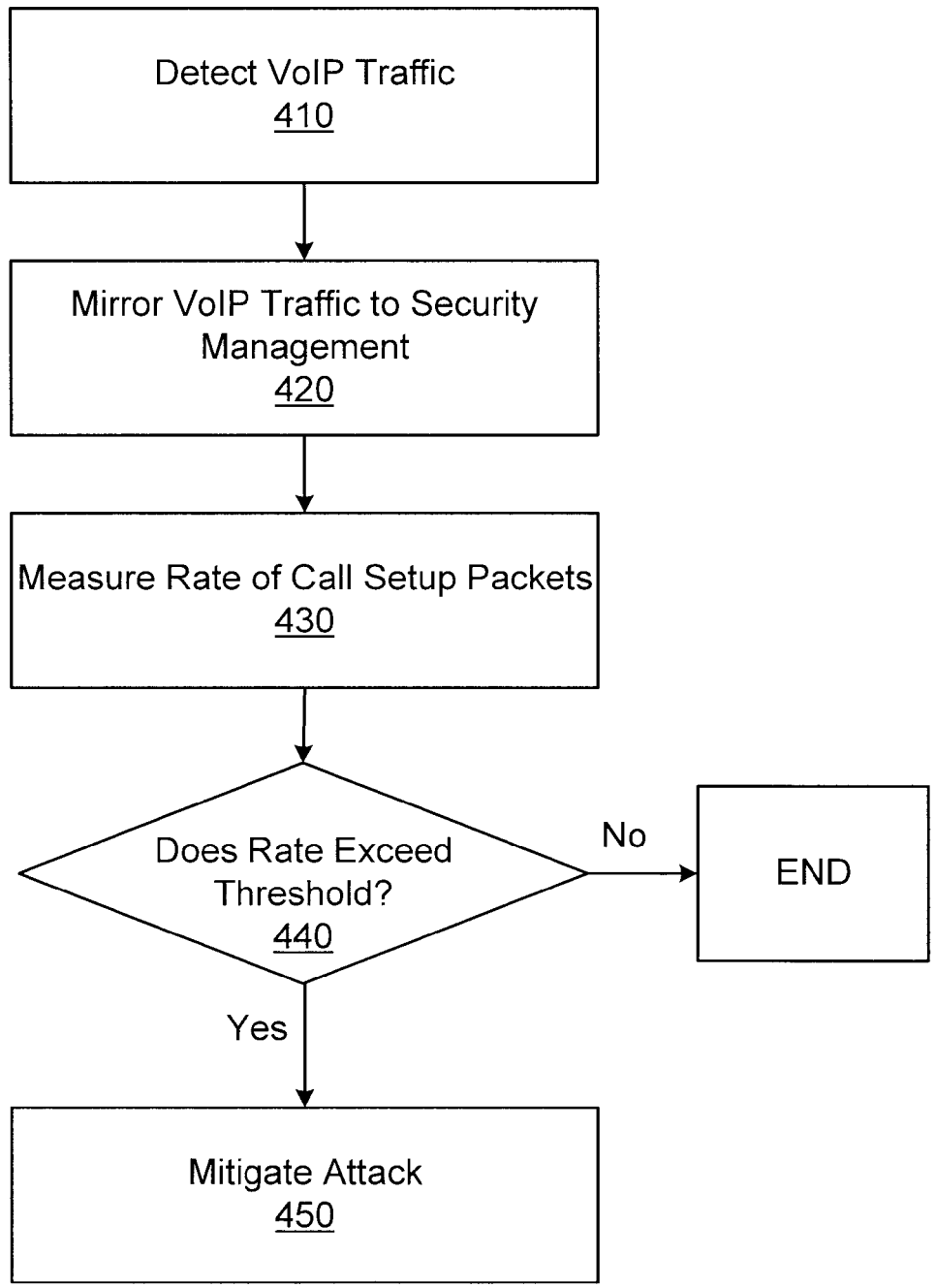
FIG. 4 is a flow diagram of an embodiment that employs security management for a network.

FIG. 4 is a flow diagram illustrating an embodiment of the invention. VoIP traffic is detected 410 by a switch on a network based on ports numbers or other packet header information. VoIP traffic is mirrored to security management 420. Security management can be implemented as a stand-alone device or as an ASIC or SoC in a network switch. Security management can also be implemented in software or in firmware. Security management measures the rate of call setup packets in the VoIP traffic 430 and determines whether the measured rate exceeds a predetermined threshold rate 440. If the measured rate is under the threshold rate, no action is taken; if, however, the measured rate exceeds the threshold rate, security management determines there is an attack and takes action to mitigate the attack. 450.

Each component described herein may be a means for performing the functions described. Each component described herein includes software, hardware, or a combination of these. The components can be implemented as software modules, hardware modules, special-purpose hardware (e.g., application specific hardware), embedded controllers, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (e.g., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.) A machine readable medium may also include a storage or database from which content can be downloaded. A machine readable medium may also include a device or product having content stored thereon at a time of sale or delivery. Thus, delivering a device with stored content, or offering content for download over a communication medium may understood as providing an article of manufacture with such content described herein.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method in a network switch, the method comprising:
  detecting Voice over Internet Protocol (VoIP) traffic at the network switch;
  measuring a rate of call setup packets in the VoIP traffic;
  detecting that a threshold is exceeded by the measured rate;
  in response to the detecting that the threshold is exceeded:
    mirroring the call setup packets in the VoIP traffic to create a copy of the call setup packets;
    sending the call setup packets from the network switch to one of a security management device and one or more destination network nodes; and
    sending the copy of the call setup packets from the network switch to the other of the security management device and the one or more destination network nodes, wherein the security management device performs an analysis of received call setup packets; and responsive to the analysis, receiving at the network switch instructions from the separate security management device, the instructions for mitigating a security threat.

2. The method of claim 1, wherein detecting VoIP traffic comprises detecting Transmission Control Protocol (TCP) traffic having a destination port number that matches a designated VoIP traffic port number.

3. The method of claim 1, wherein receiving the instructions comprises receiving a dynamically generated policy from the security management device, the policy directing the network switch to block and/or ignore the call setup packets in the VoIP traffic the method further comprising:
implementing in real-time, the dynamically generated policy from the security management device.

4. The method of claim 1, wherein detecting VoIP traffic comprises detecting Universal Datagram Protocol (UDP) traffic having a destination port number that matches a designated VoIP traffic port number.

5. The method of claim 4, wherein measuring the rate of call setup packets in the VoIP traffic comprises measuring a number of VoIP sessions initiated via International Telecommunications Union (ITU) H.323 compatible call setup requests or measuring a number of Internet Engineering Task Force (IETF) Session Initiation Protocol (SIP) compatible call set up requests, or both.

6. The method of claim 1, further comprising determining whether VoIP traffic originates from a valid VoIP handset.

7. The method of claim 6, wherein the valid VoIP handset is identified based on a valid Internet Protocol (IP) address and a valid Media Access Control (MAC) address.

8. The method of claim 1, wherein mitigating the threat comprises at least one of blocking traffic associated with the threat and redirecting traffic from the source of the threat.

9. A system, comprising:
a network switch to automatically detect Voice over Internet Protocol (VoIP) traffic;
a security management device communicatively interfaced with the network switch via a network;
wherein the network switch to further:
measure a rate of original call setup packets in the VoIP traffic,
detect that a threshold is exceeded by the measured rate, and
in response to the detecting that the threshold is exceeded:
mirror the original call setup packets in the VoIP traffic to create a copy of the original call setup packets,
send the original call setup packets from the network switch to one of the security management device and one or more destination network nodes, and
send the copy of the original call setup packets from the network switch to the other of the security management device and the one or more destination network nodes; and
wherein the security management device to perform an analysis of the call setup packets sent from the network switch to the security management device, and send to the network switch instructions generated based on the analysis, the instructions to mitigate a security threat.

10. The system of claim 9, wherein the security management device to further:
determine a source of the threat, including generating a model of a communication stream between the source of the threat and an intended destination of the threat; and
redirect traffic sent from the source of the threat.

11. The system of claim 9, where the security management device is virtually in-line within the network and not physically in-line with the network, and wherein only copies of call setup packets in VoIP traffic suspected to contain a threat are passed to the security management device, with all other traffic bypassing the security management device.

12. The system of claim 10, wherein the security management device to redirect traffic sent from the source of the threat comprises the security management device to redirect the traffic based at least in part on one or more of access control lists (ACL(s)), policy-based routing, virtual local area network (VLAN) identifications (IDs), Hypertext Transfer Protocol (HTTP) information, or Extensible Markup Language (XML) tags.

13. A non-transitory machine-readable storage medium having instructions stored thereon that, when executed by a network switch, cause the network switch to perform a method comprising:
detecting Voice over Internet Protocol (VoIP) traffic at the network switch;
measuring a rate of call setup packets in the VoIP traffic;
detecting that a threshold is exceeded by the measured rate;
in response to the detecting that the threshold is exceeded:
mirroring the call setup packets in the VoIP traffic to create a copy of the call setup packets;
sending the call setup packets from the network switch to one of a security management device and one or more destination network nodes; and
sending the copy of the call setup packets from the network switch to the other of the security management device and the one or more destination network nodes, wherein the security management device performs an analysis of received call setup packets; and
responsive to the analysis, receiving at the network switch instructions from the separate security management device, the instructions for mitigating a security threat.

14. The non-transitory machine-readable storage medium of claim 13, wherein detecting VoIP traffic comprises detecting Transmission Control Protocol (TCP) traffic having a destination port number that matches a designated VoIP traffic port number.

15. The non-transitory machine-readable storage medium of claim 13, wherein receiving the instructions comprises receiving a dynamically generated policy from the security management device, the policy directing the network switch to block and/or ignore the call setup packets in the VoIP traffic, the method further comprising:
implementing in real-time, the dynamically generated policy from the security management device.

16. The non-transitory machine-readable storage medium of claim 13, wherein detecting VoIP traffic comprises detecting Universal Datagram Protocol (UDP) traffic having a destination port number that matches a designated VoIP traffic port number.

17. The non-transitory machine-readable storage medium of claim 16, wherein measuring the rate of call setup packets in the VoIP traffic comprises measuring a number of VoIP sessions initiated via International Telecommunications Union (ITU) H.323 compatible call setup requests or measuring a number of Internet Engineering Task Force (IETF) Session Initiation Protocol (SIP) compatible call set up requests, or both.

18. The machine-readable storage medium of claim 13, wherein the method further comprises determining whether VoIP traffic originates from a valid VoIP handset.

19. The non-transitory machine-readable storage medium of claim 18, wherein the valid VoIP handset is identified based on a valid Internet Protocol (IP) address and a valid Media Access Control (MAC) address.

20. The non-transitory machine-readable storage medium of claim 13, wherein mitigating the attack comprises at least one of blocking traffic associated with the threat and redirecting traffic from the source of the threat.

* * * * *